United States Patent
Schlick et al.

(10) Patent No.: US 7,119,666 B2
(45) Date of Patent: Oct. 10, 2006

(54) METHOD FOR CONTROLLING AND EVALUATING A SENSOR DEVICE SHARED BY A PLURALITY OF APPLICATIONS

(75) Inventors: Michael Schlick, Pfinztal (DE); Juergen Hoetzel, Florstadt (DE); Andreas Hein, Niedernberg (DE)

(73) Assignee: Robert Bosch GmbH, (DE)

( * ) Notice: Subject to any disclaimer, the term of this patent is extended or adjusted under 35 U.S.C. 154(b) by 0 days.

(21) Appl. No.: 10/468,539

(22) PCT Filed: Feb. 2, 2002

(86) PCT No.: PCT/DE02/00388

§ 371 (c)(1),
(2), (4) Date: Jan. 22, 2004

(87) PCT Pub. No.: WO02/067012

PCT Pub. Date: Aug. 29, 2002

(65) Prior Publication Data

US 2004/0113759 A1    Jun. 17, 2004

(30) Foreign Application Priority Data

Feb. 16, 2001 (DE) ................................ 101 07 215

(51) Int. Cl.
*G60Q 1/00* (2006.01)
(52) U.S. Cl. .............................. 340/425.5; 340/932.2; 340/903; 340/426.24; 180/271; 701/45
(58) Field of Classification Search ............ 340/425.5, 340/932.2, 903, 522, 521, 426.24; 761/45; 180/271

See application file for complete search history.

(56) References Cited

U.S. PATENT DOCUMENTS

| | | | | | |
|---|---|---|---|---|---|
| 6,037,860 | A | * | 3/2000 | Zander et al. | 340/436 |
| 6,091,323 | A | * | 7/2000 | Kawai | 340/435 |
| 6,157,892 | A | * | 12/2000 | Hada et al. | 701/301 |
| 6,317,693 | B1 | * | 11/2001 | Kodaka et al. | 701/301 |
| 6,326,887 | B1 | * | 12/2001 | Winner et al. | 340/435 |
| 6,424,273 | B1 | * | 7/2002 | Gutta et al. | 340/937 |

FOREIGN PATENT DOCUMENTS

| | | |
|---|---|---|
| DE | 197 39 655 | 11/1998 |
| DE | 197 36 840 | 2/1999 |
| DE | 198 45 568 | 10/1999 |
| DE | 198 21 163 | 11/1999 |
| DE | 199 35 456 | 7/2000 |
| EP | 0 899 583 | 3/1999 |
| WO | 00 73818 | 12/2000 |

OTHER PUBLICATIONS

M. Kunert, *Radar-Based Near-Field Sensor Technology For Pre-Crash*, VDI Reports 1471, Sep. 30, 1999, pp. 169-185.
J., Weller, *Predictive Sensor Technology For Future Safety Systems*, VDI Reports 1471, Sep. 30, 1999, pp. 119-136.

* cited by examiner

*Primary Examiner*—Anh V. La
(74) *Attorney, Agent, or Firm*—Kenyon & Kenyon LLP

(57) ABSTRACT

The present invention provides a method and a device for controlling and evaluating at least one sensor device jointly used by a plurality of applications, in particular occupant-assistance/occupant-protection applications in an apparatus of locomotion, having the following steps: the measuring of certain locomotion apparatus parameters by a situation-detection device for determining the situation of the apparatus of locomotion with respect to its surroundings; the querying of the locomotion apparatus situation by a control device connected to the situation-detection device; and the activation of an application corresponding to the locomotion apparatus situation, by the control device.

24 Claims, 2 Drawing Sheets

METHOD FOR CONTROLLING AND EVALUATING A SENSOR DEVICE SHARED BY A PLURALITY OF APPLICATIONS

FIELD OF THE INVENTION

The present invention relates to a device for controlling and evaluating at least one sensor device jointly used by several applications, in particular occupant-assistance/occupant-protection applications in means of locomotion, as well as to a corresponding method.

Although applicable to any means of locomotion, the present invention, as well as the underlying objective, are explained with regard to a system located on board a motor vehicle.

BACKGROUND INFORMATION

In order to make it easier to drive a motor vehicle and prevent collisions with a vehicle or other objects in the way, it is well-known that, at certain points of the motor vehicle, sensors are provided, which emit signals in order to receive the signals reflected by the obstacle again. In this context, the distance between the sensor positioned on the vehicle and the obstacle is determined from the propagation time of the signal from the sensor to the obstacle and back again. Various devices, which, e.g. function on the basis of radar, lasers, ultrasonics, or video analysis, are known for detecting objects, and in particular, for measuring distance. The different sensor technologies are used as a function of the required measurement. Because of their very high resolution, ultrasonic sensors are especially useful in close range.

The data from the sensor measurements are needed for various applications, such as a park-distance control system, a stop-and-go assistance system useful in a traffic jam, or a pre-crash detection system.

In known methods heretofore, each application functions as a separate system having its own set of sensors, its own control electronics, and its own software. The controllability of measurements is limited to the activation and deactivation of the corresponding sensors. Therefore, the concurrent use of several applications causes conflict situations.

In addition, one cannot just position as many sensors on a vehicle as one would like because of the limited space available and the complicated wiring.

Therefore, the general objective of the present invention is to render the sensor signals received by a sensor device, useful several times, i.e. render them useful for several applications running concurrently.

In addition, the controllability of the sensors should be improved, so that objects in the monitoring range can be selectively tracked.

SUMMARY OF THE INVENTION

The idea forming the basis of the present invention is that certain locomotion-means parameters are measured by a situation-detection device to determine the situation of the means of locomotion with respect to its surroundings; that the locomotion-means situation is queried by a control device connected to the situation-detection device; and that an application corresponding to the locomotion-means situation is activated, along with its required components, by the control device.

The method of the present invention and the corresponding device have the advantage over the known systems, that a conflict situation is detectable in the event of several applications accessing a common sensor device, and it may be reacted to appropriately. Consequently, the individual applications do not block each other's access to the sensor device.

In addition, a separate sensor device does not have to be attached for each application, which saves space and is associated with a lower expenditure for assembly, due to less wiring.

According to an advantageous further refinement, the components assigned to the activated application may be correspondingly activated by the control device. Therefore, the measurement data are not transformed or evaluated for all of the components, but just for the necessary components. The lower amount of computing expenditure accelerates and simplifies the entire operation of the method.

According to a further preferred refinement, a transformation device is provided whose results are used by several applications.

According to a further preferred refinement, a sensor-device drive circuit is provided whose results are used by several transformation devices. This allows the sensor devices to be installed and utilized in an optimum manner.

A further preferred refinement provides for the components assigned to the corresponding application to take the form of a sensor device, transformation device, and evaluation device. In this context, each of these components is connectible to the control device by a point-to-point connection or a bus system in the same manner as the situation-detection device. The transformation device is additionally connectible to the sensor device, and the evaluation device is additionally connectible to the transformation device.

According to a further preferred refinement, the evaluation device is connectible to the situation-detection device. Thus, in addition to external events, the situation component also takes the evaluation results of the corresponding measurement into consideration. This ensures an even more accurate reaction to the corresponding locomotion-means situation.

According to another preferred refinement, another display device is additionally provided, which is connectible to both the control device and the evaluation device. This display device supplies the evaluated measuring data to the corresponding occupants of the motor vehicle in a user-friendly manner.

According to a further preferred refinement, a priority control system is provided in the control device, in order to determine the next process step to be executed. Consequently, additional conflict situations are prevented, and the applications most closely corresponding to a vehicle situation are activated. Alternatively, the control device may also initiate a type of control, which represents a compromise between the demands of the individual applications and therefore ensures the functionality of all applications.

A further preferred refinement provides for the sensor device to take the form of an ultrasonic device, radar device, or video device. However, other sensor technologies are also conceivable.

According to a further, preferred refinement, the applications take, for example, the form of a park-distance control system, stop-and-go assistant system, and/or pre-crash protection assistance system. In this case, further applications are also conceivable.

According to a further preferred refinement, the transformation device and the evaluation device may be integrated into the control device and form, together with it, a central unit. Because of a possible interface, this simplifies the connection of the individual components to each other and to the control device.

DETAILED DESCRIPTION

Figure 1:
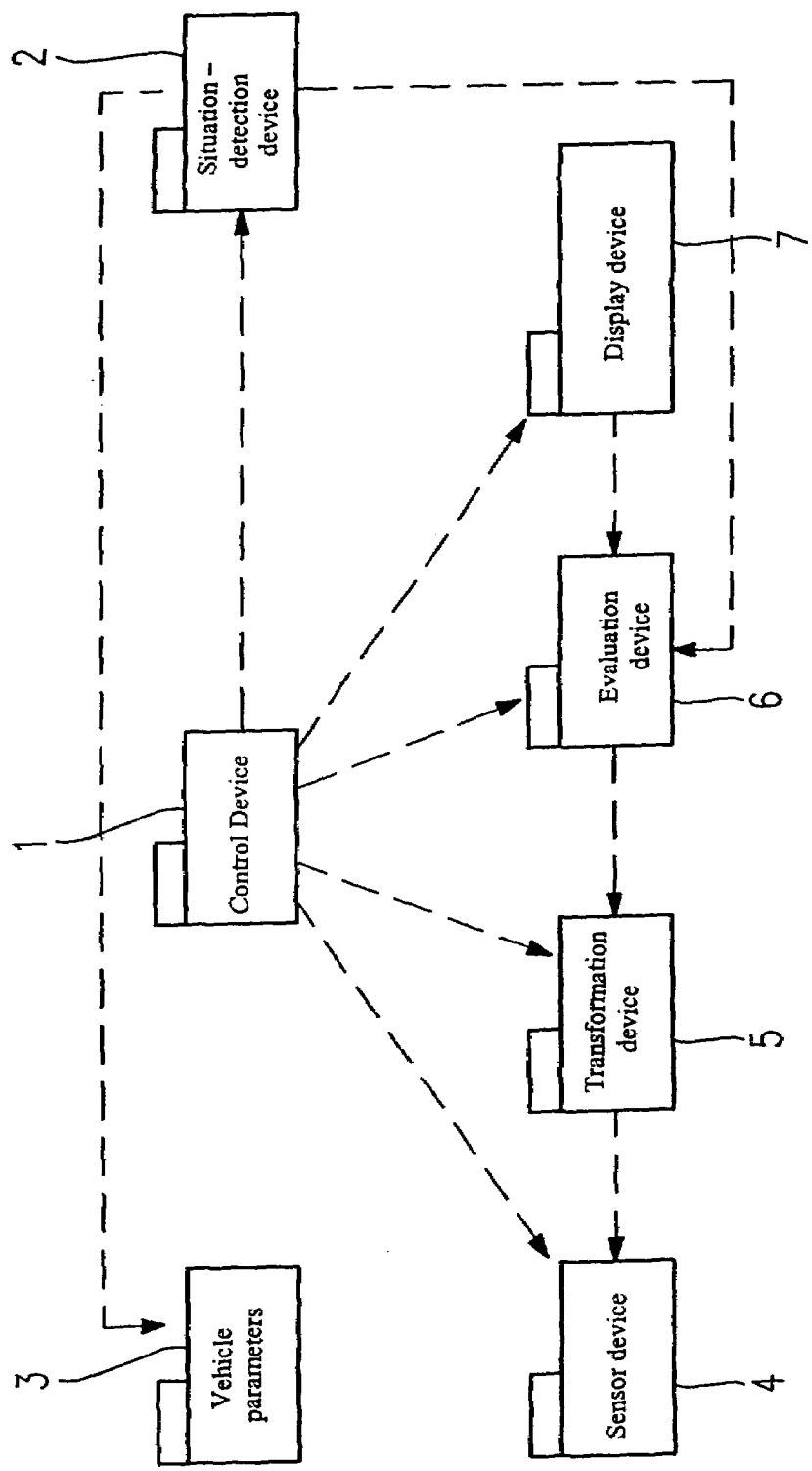
FIG. 1 shows a schematic block diagram of a control/evaluation device according to exemplary embodiment of the present invention.

In a schematic block diagram, FIG. 1 shows the interaction of the individual components and devices according to a first exemplary embodiment of the present invention. In this context, the arrows between the individual components or devices indicate a dependence of a component or device on the component or device situated at the tip of the arrow.

The system includes a situation-detection device 2, which formulates conditions from which possible situations of the motor vehicle in relation to the motor-vehicle surroundings may be derived. In this context, specific vehicle parameters 3 are used for an analysis of the vehicle situation, such as gear setting, wheel speed, speed reading, ABS travel sensor, etc. The present situation of the vehicle, i.e. if the motor-vehicle is presently in a parking situation, is traveling normally, or is, for example, in a pre-crash situation, may be determined by situation-detection device 2 according to these parameters 3. A priority control system, which gives priority to a higher-priority application in possible conflict situations of the individual applications, may additionally be provided in situation-detection device 2. For example, a pre-crash situation should be assigned, for reasons of safety, a higher priority than a stop-and-go situation.

Situation-detection device 2 is connected to a control device 1, each of the individual connections generally being realized in an advantageous manner, using a point-to-point connection or a bus system. Control device 1 receives the present motor-vehicle situation from situation-detection device 2 and activates the application that appears to be most favorable for this situation.

In this context, control device 1 uses situation-detection device 2 and all components 4, 5, 6, 7 of the individual applications, via corresponding interfaces, and consequently determines the sequence of the process steps or processing steps to be carried out next as a function of the specific vehicle situation, the components of the individual applications being described in more detail in the following. In this context, a priority-control system may also be provided in control device 1.

Connected to control device 1 is a sensor device 4, which realizes all of the details in connection with the sensor measurements and may be implemented as a hardware component.

In addition, a transformation device 5 is connected to control device 1 and sensor device 4. Transformation device 5 uses the measuring data of sensor device 4 via a corresponding interface and converts them to state variables, which describe the specific vehicle status. This description may have the form of a list of objects. In this connection, an object describes an obstacle in space. The description includes, e.g. the spatial coordinates and movement coordinates. In turn, the state variables are made available for an evaluation, via an appropriate interface.

Such an evaluation is taken over by an evaluation device 6, which is connected to control device 1 and transformation device 5. In each instance, evaluation device 6 analyzes the state variables of transformation device 5 with regard to the active application. Thus, the vehicle status may be used, for example, as an input for a park-distance control system or a precrash application.

In addition, a display device 7 is advantageously provided, which is connected to control device 1 and evaluation device 6 in a manner known per se. Display device 7 may take the form of both an optical device and an acoustic device and either indicate the results of the evaluation, e.g. distances to the next obstacle, to the occupants of the motor vehicle, or transmit warning signals to the occupants of the motor vehicle in response to a specific distance to the next obstacle being undershot.

Evaluation device 6 is also advantageously coupled to situation-detection device 2, which means that control device 1 may determine the vehicle situation much more realistically, because both vehicle parameters 3 and evaluation results are considered.

Figure 2:
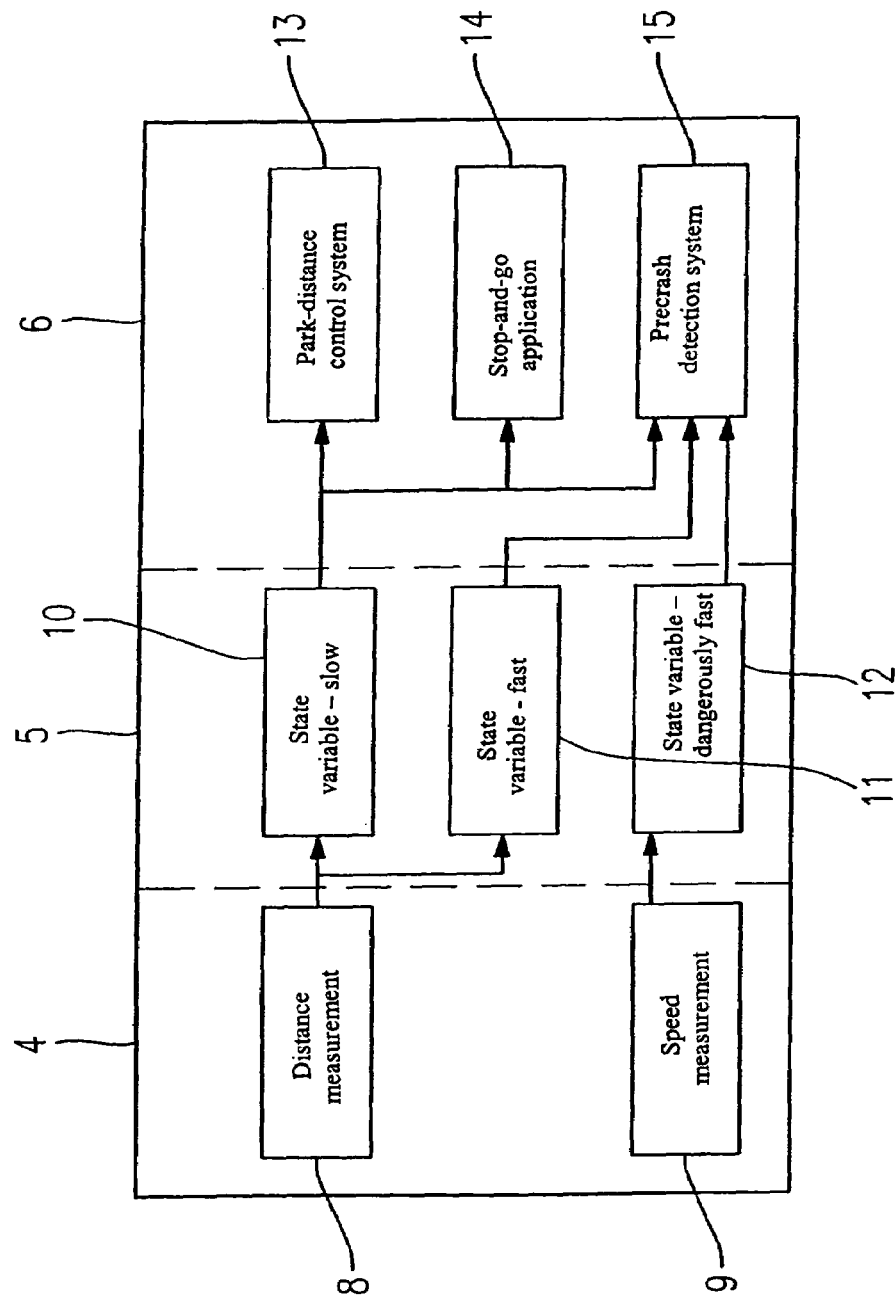
FIG. 2 shows a schematic block diagram of the flow of data within the system, according to the exemplary embodiment of the present invention in FIG. 1.

This principle shall be explained by way of example, using FIG. 2, where a schematic block diagram of the flow of data within the algorithm according to an exemplary embodiment of the present invention is shown by way of example.

Starting out from a measurement carried out by sensor device 4, e.g. a distance measurement 8 or a speed measurement 9, the information flows through the respective connection to transformation device 5.

In this context, the sensors of sensor device 4 are controllable. In addition, the system takes continuous measurements 8, 9 and therefore adjusts itself rapidly to the changing vehicle situations. Control device 1 may react online to the present vehicle situation and activate, in each case, the necessary application, together with its components.

Transformation device 5 converts the measuring data into state variables 10, 11, 12 describing the vehicle status, e.g. if the object in the range of the motor vehicle is a slow (transformation 10), fast (transformation 11), or even dangerously fast object (transformation 12).

Consequently, these state variables are each analyzed by evaluation device 6 in an application-specific manner. Depending on if a park-distance control system 13, a stop-and-go application 14, or a precrash detection system 15 is useful on the basis of the current vehicle situation, the state variables are rendered usable for the specific application.

The present invention has the advantage, that the different components of a sensor device 4, measurement and transformation, may be simultaneously used by different applications. Using this structure, is possible to recognize which application requires which processing components. As is apparent from Figure a park-distance control system requires, for example, its specific evaluation, a transformation for slow objects, and a measurement of distance.

This permits modular control of the measuring system, for, depending on the activated application, the corresponding components are activated. Furthermore, it is possible to integrate further applications into the system, as only the correspondingly new evaluation component is updated.

In addition, the transformation with the aid of transformation device 5 produces a description of the relevant object, which is independent of the actual evaluation. Therefore, the description must only be calculated once, and not individually for all applications. In addition, the applications do not directly access the sensors, but rather a higher interface.

The repeated use of measurements and interim results is synonymous with the repeated use of sensors and partial algorithms. The introduction of the situation component also allows the resources, e.g. the sensors and the processing time, to be controlled in a selective manner for both individual applications and a combination of applications having different priorities.

The coupling of the current situation to results of sensor measurements also allows the measuring range to be selectively adjusted for subsequent measurements, and allows objects to be tracked for certain applications. This ensures that the sensors can be controlled in an improved manner.

Although the present invention was described above with reference to a preferred embodiment, it is not limited thereto, but instead may be modified in a variety of ways.

For example, the sensor device may take the form of a video device, which means that an object classification or a lane change would be detectable, and that corresponding applications would be capable of being activated.

It is also possible to use the present invention for mixed sensor devices, e.g. for video and radar.

What is claimed is:

1. A method for controlling and evaluating at least one sensor device jointly used by a plurality of applications, comprising:
   measuring locomotion-means parameters by a situation-detection device for determining a situation of the means of locomotion with respect to surroundings thereof;
   querying a locomotion-means situation by a control device connected to the situation-detection device;
   activating an application of the plurality of applications and corresponding to the locomotion-means situation;
   converting measuring data from the at least one sensor device into state variables by a transformation device connected to the at least one sensor device;
   evaluating the state variables from the transformation device with regard to the activated application;
   rendering usable the state variables for the activated application by an evaluation device connected to the control device and the transformation device.

2. The method as recited in claim 1, wherein:
the plurality of applications includes occupant-assistance/occupant-protection applications in means of locomotion.

3. The method as recited in claim 1, further comprising:
activating at least one component assigned to the activated application by the control device.

4. The method as recited in claim 1, wherein:
the at least one assigned component includes the only one sensor device.

5. The method as recited in claim 1, wherein:
the at least one assigned component includes an evaluation device and is connected to the transformation device.

6. The method as recited in claim 3, further comprising:
connecting via one of point-to-point connection and a bus system the situation-detection device and the at least one component.

7. The method as recited in claim 5, further comprising:
coupling the evaluation device to the situation-detection device.

8. The method as recited in claim 5, further comprising:
connecting a display device to the control device and the evaluation device.

9. The method as recited in claim 1, further comprising:
integrating into the control device a priority-control system for determining a next process step to be carried out.

10. The method as recited in claim 1, wherein:
the only one sensor device includes one of an ultrasonic device, a radar device, and a video device.

11. The method as recited in claim 1, wherein:
the applications include at least one of a park-distance control system, a stop-and-go assistant system, and a pre-crash protection assistance system.

12. A device for controlling and evaluating at least one sensor device jointly used by a plurality of applications, comprising:
   a situation-detection device for measuring locomotion-means parameters, in order to determine a situation of the means of locomotion with respect to surroundings thereof;
   a control device that is connectible to the situation-detection device for querying the locomotion-means situation;
   a transformation device connected to the at least one sensor device and for converting measuring data from the sensor device into state variables; and
   an evaluation device connected to the control device and the transformation device, the evaluation device evaluating the state variables from the transformation device with regard to the activated application and rendering usable the state variables for the activated application.

13. The device as recited in claim 12, wherein:
the plurality of applications includes occupant-assistance/occupant-protection applications in means of locomotion.

14. The device as recited in claim 12, wherein:
at least one component assigned to the activated application is activated by the control device.

15. The device as recited in claim 12, wherein:
the at least one assigned component includes the only one sensor device.

16. The device as recited in claim 12, wherein:
the at least one assigned component includes an evaluation device and is connected to the transformation device.

17. The device as recited in claim 14, further comprising:
one of point-to-point connection and a bus system via which the situation-detection device and the at least one component.

18. The device as recited in claim 16, wherein:
the evaluation device is connectible to the situation-detection device.

19. The device as recited in claim 16, further comprising:
a display device connectible to the control device and the evaluation device.

20. The device as recited in claim 12, further comprising:
a priority-control system for determining a next process step to be carried out and being integrated into the control device.

21. The device as recited in claim 12, wherein:
the only one sensor device includes one of an ultrasonic device, a radar device, and a video device.

22. The device as recited in claim 12, wherein:
the applications include at least one of a park-distance control system, a stop-and-go assistant system, and a pre-crash protection assistance system.

23. The device as recited in claim 12, wherein:
different transformation devices access the same results of the only one sensor device.

24. The device as recited in claim 16, wherein:
different evaluation devices for different applications access the same results of the transformation device.

* * * * *

UNITED STATES PATENT AND TRADEMARK OFFICE
CERTIFICATE OF CORRECTION

| | | |
|---|---|---|
| PATENT NO. | : 7,119,666 B2 | Page 1 of 1 |
| APPLICATION NO. | : 10/468539 | |
| DATED | : October 10, 2006 | |
| INVENTOR(S) | : Michael Schlick et al. | |

It is certified that error appears in the above-identified patent and that said Letters Patent is hereby corrected as shown below:

Column 5, line 46 change "claim 1," to --claim 3,--

Column 5, line 48 change "claim 1," to --claim 3,--

Column 6, line 17 change "situation" to -- situation to activate a corresponding application;--

Column 6, line 33 change "claim 12," to --claim 14,--

Column 6, line 35 change "claim 12," to --claim 14,--

Signed and Sealed this

Twenty-first Day of August, 2007

JON W. DUDAS
*Director of the United States Patent and Trademark Office*